United States Patent [19]
Hogan

[11] 3,853,485
[45] Dec. 10, 1974

[54] CORE MEMBER FOR CATALYTIC OXIDATION CONVERTER

[75] Inventor: Robert G. Hogan, Painted Post, N.Y.

[73] Assignee: Corning Glass Works, Corning, N.Y.

[22] Filed: Dec. 11, 1972

[21] Appl. No.: 313,694

[52] U.S. Cl. ............ 23/288 F, 161/139, 252/477 R
[51] Int. Cl. ......... B01j 9/04, B32b 3/20, F01n 3/14
[58] Field of Search ...... 23/288 F, 284, 252, 288 R; 252/477 R; 138/40, 41; 302/64; 264/167; 60/299, 311; 161/139

[56] References Cited
UNITED STATES PATENTS

| | | | |
|---|---|---|---|
| 3,441,381 | 4/1969 | Keith et al. | 23/288 F |
| 3,572,391 | 3/1971 | Hirsch | 138/40 |
| 3,577,710 | 5/1971 | Feldman | 23/288 F UX |
| 3,749,130 | 7/1973 | Howitt et al. | 23/288 F UX |

Primary Examiner—Joseph Scovronek
Assistant Examiner—Michael S. Marcus
Attorney, Agent, or Firm—Charles W. Gregg; Clarence R. Patty, Jr.

[57] ABSTRACT

A core member for a catalytic oxidation converter for internal combustion engine exhaust gases. The core member comprises a cylindrical body of a refractory material preferably having planar ends or faces and a multitude of passages extending therethrough from one planar end or face thereof to the other parallel with the peripheral wall or longitudinal axis of the cylindrical body, the multitude of passages cross-sectionally comprising a plurality of concentric patterns thereof with the cross-sectional area of the passages increasing progressively from a central one of the plurality of patterns of passages towards the next concentric pattern of passages. The cylindrical body of the invention more uniformly distributes exhaust gas flow through the passages of the core member because of more even distribution of exhaust gases across or over the gas inlet face or end of the cylindrical body.

10 Claims, 3 Drawing Figures

CORE MEMBER FOR CATALYTIC OXIDATION CONVERTER

BACKGROUND OF THE INVENTION

Core members heretofore used in catalytic oxidation converters for exhaust gases from internal combustion engines have, insofar as is known, comprised generally cylindrical bodies of a refractory material having a plurality of relatively minute passages of generally equal cross-sectional area extending therethrough from one planar end or face of the body to the other in a direction generally normal to said faces and linearly parallel with the outer periphery or longitudinal axis of the cylindrical body. In the use of such a cylindrical body for the core member of a catalytic oxidation converter for said exhaust gases, it has been found that the center region of the body ages or deteriorates more rapidly than the outer regions thereof because the cylindrical body is usually of a larger diameter than an exhaust pipe carrying said exhaust gases and connected to a converter embodying said cylindrical body or core member. This, because of an uneven distribution of said gases across or over the exhaust gas inlet face or end of said body, causes a maximum flow of said exhaust gases through the passages in said center region of the cylindrical body or core member with a lesser flow of said gases through the passages in the outer peripheral regions of said body or member surrounding said center region. This, of course, causes earlier fatigue of said center region due to a substantial concentration of the heat of said exhaust gases in such region as well as earlier exhaustion or deterioration of the oxidation catalyst material deposited on or coating the walls defining said passages in said center region. In other words the non-uniform distribution of exhaust gases over the gas inlet end of said core member or cylindrical body results in substantially non-uniform deterioration and/or fatigue of said body or member and, therefore, a lesser life period of use of such member or body than if the flow of exhaust gases therethrough is more uniform through all of the passages of the core member or cylindrical body. Accordingly, it is an object of the present invention to provide a novel type of core member or cylindrical body for use in a catalytic oxidation converter, such member or body embodying exhaust gas passages of different cross-sectional areas to provide more even distribution of exhaust gases across or over the gas inlet end of the core member or body and, therefore, more even distribution of exhaust gas flow through all of said gas passages.

Other objects and characteristic features of the invention will become apparent as the description proceeds.

SUMMARY OF THE INVENTION

The invention is believed to be adequately summarized in the foregoing abstract of the disclosure and, therefore, to prevent repetition or redundancy, no further brief summary of the invention is considered necessary nor will be given.

BRIEF DESCRIPTION OF THE DRAWINGS

In the Drawings

Similar reference characters refer to similar parts in each of the Figures of the drawings.

PREFERRED EMBODIMENTS OF THE INVENTION

Figure 1:
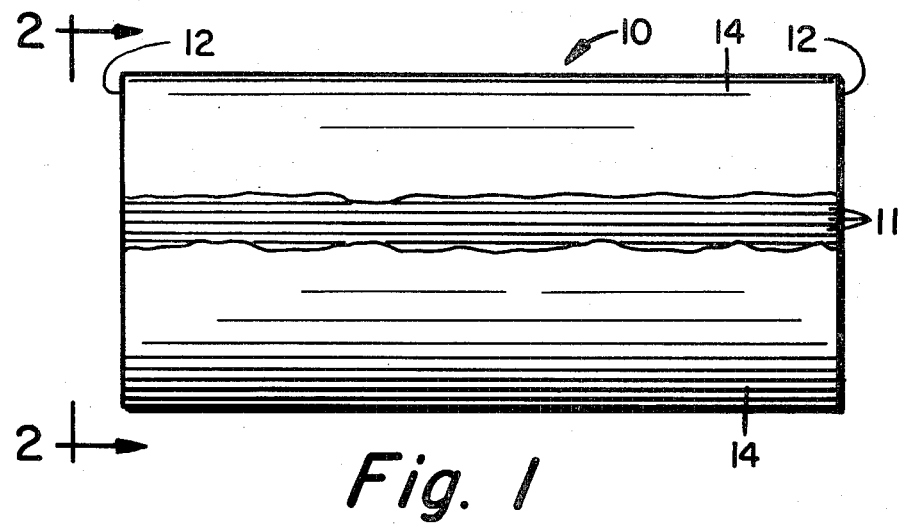
FIG. 1 comprises a side elevational view on a reduced scale of a cylindrical body or core member of a refractory material and embodying the invention, the peripheral wall of such member being partially broken away to illustrate gas flow passages extending therethrough.
Figure 2:
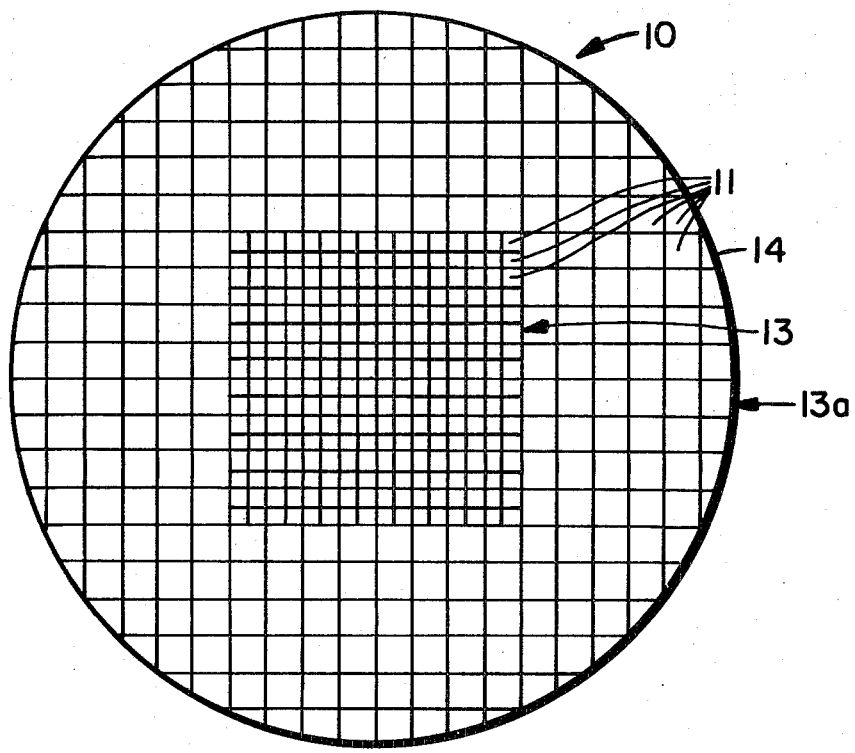
FIG. 2 comprises an end or face view of the cylindrical body or core member of FIG. 1, such view being on a larger scale and taken generally along line 2—2 of FIG. 1, and illustrating first planar or cross-sectional patterns or arrangements of said gas flow passages extending through the core member or body.

Referring first to FIGS. 1 and 2 of the drawings, there is shown a generally cylindrical core member of body 10 of a refractory material and intended for use in a catalytic oxidation converter, such core member or body having a multitude of passages such as 11, each of which have a relatively minute cross-sectional area, extending therethrough from one of the planar ends of faces such as 12 thereof to the other. With reference to FIG. 2, said multitude of passages such as 11 comprises a first or center cross-sectional cluster or pattern 13 of the smallest cross-sectional area practicable for the material of which core member or body 10 is made, and a cross-sectional annular pattern 13a of passages surrounding pattern 13 and extending to the peripheral wall or surface 14 of core member or body 10, the passages of such annular pattern having a larger cross-sectional area than the passages of pattern 13 as clearly illustrated in FIG. 2 of the drawings.

Figure 3:
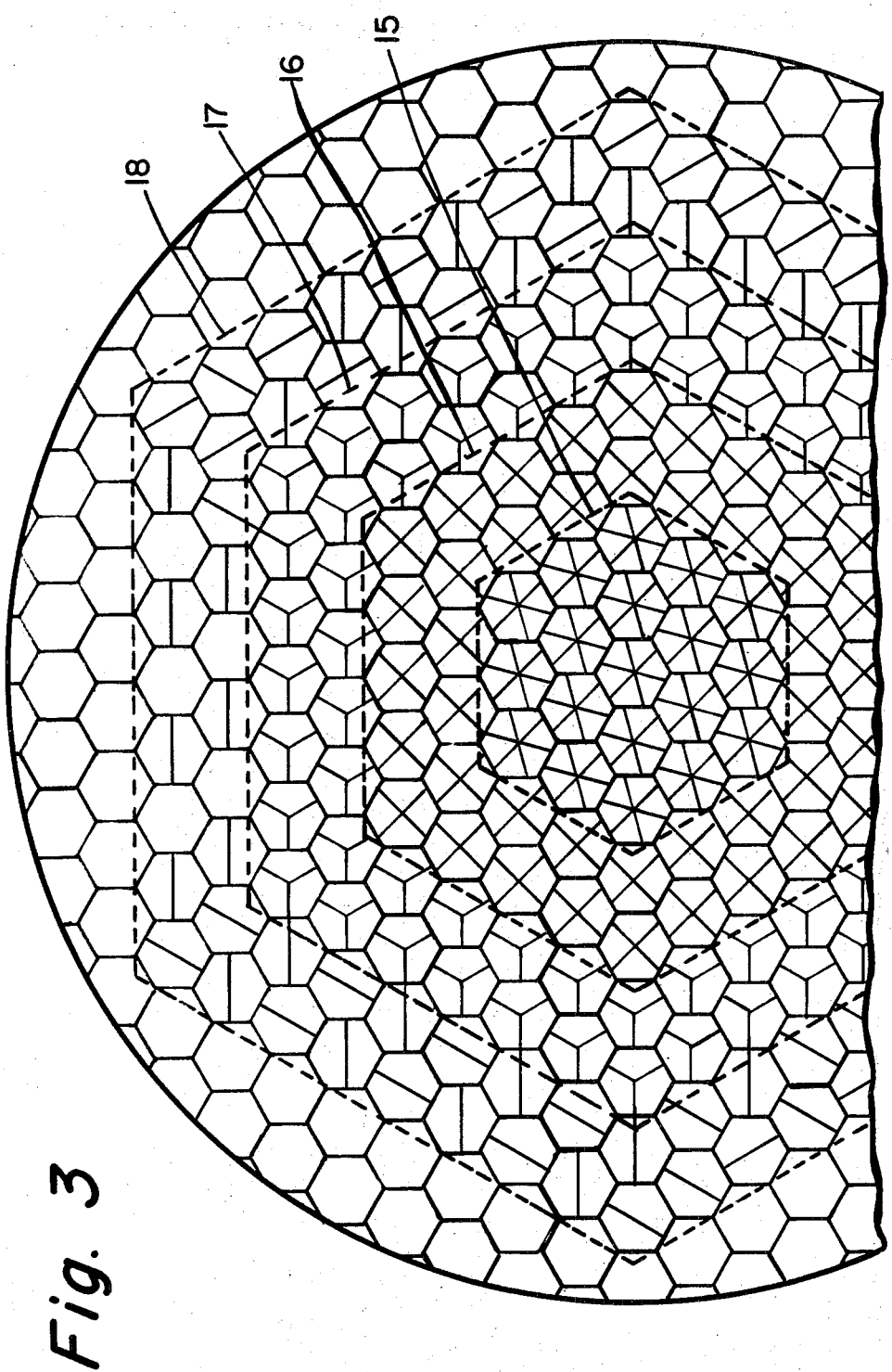
FIG. 3 is a view similar to FIG. 2 but on an even larger scale and illustrating second planar or cross-sectional patterns or arrangements of said gas flow passages.

Referring now to FIG. 3 of the drawings, there is shown preferred cross-sectional patterns or arrangements of groups of passages of a core member or body such as 10 for a catalytic oxidation converter in accordance with the present invention. The patterns or arrangements of passages of FIG. 3 includes networks of relatively thin walls which define a center and generally hexagonal cluster or pattern (broken line area 15) of a plurality of hexagonal groups of passages with each such group of passages being geometrically congruent in overall areal cross-section with each of the other groups of such pattern or cluster, and said groups each comprising six passages extending axially through the cylindrical body or core member such as 10.

As further shown in FIG. 3, the pattern or cluster such as 15 of the above discussed groups of passages is surrounded by a first generally annular cross-sectional pattern (broken line 16) of a plurality of hexagonal groups of passages with each such group being geometrically congruent in overall areal cross-section with each of the other groups of such pattern and with each of the groups of said hexagonal pattern or cluster, each of the groups of the annular pattern (broken line 16) comprising four passages and such groups extending through the cylindrical body or core member 10 in a surrounding relationship with said hexagonal cluster or pattern.

The above-mentioned first annular pattern of a plurality of hexagonal groups of passages is surrounded by a second generally annular cross-sectional pattern (broken line 17) of a plurality of hexagonal groups of passages with each of such groups having three passages each and with such second pattern being geometrically similar in overall areal cross-section with said first annular pattern and with each group of passages of the second annular pattern being geometrically congruent in overall areal cross-section with each of the other such groups of such pattern and with each of said groups of said hexagonal and said first annular patterns.

There is a third generally annular cross-sectional pattern (broken line 18) of groups of passages with each of such groups having two passages each, such pattern being geometrically similar to said second annular pattern and extending through said cylindrical body or core member, such as 10, in a surrounding relationship with such second annular pattern, and a fourth generally annular cross-sectional pattern of passages extending through said cylindrical body or core member in a surrounding relationship with said third annular pattern. The fourth annular pattern extends to and includes the peripheral wall or surface 14 of the cylindrical body or core member such as 10 and the passages of such fourth pattern are, where possible, or are, at least partly, geometrically congruent in areal cross-section to the areal cross-sections of each of the groups of passages of the previously mentioned patterns of such groups thereof.

As is well known in the art, the walls or networks of walls defining the peripheral limits of the passages extending through a core member or cylindrical body such as 10 have deposited thereon an oxidation catalyst material which is not illustrated in the drawings for purposes of simplification thereof. Such material is so deposited or provided for the catalytic oxidation operation of converters using the core members or bodies of the present invention and, in this connection, reference is made to U.S. Pat. No. 3,441,381, issued Apr. 29, 1969 to C. D. Keith et al. for specific examples of materials which can be used as oxidation catalysts for exhaust gases from internal combustion engines.

Although there is herein shown and described only two forms of catalytic converter core members or cylindrical bodies embodying the invention, it will be understood that various changes and modifications may be made therein within the purview of the appended claims without departing from the spirit and scope thereof.

What is claimed is:

1. A core member for use in a catalytic oxidation converter for internal combustion engine exhaust gases, such member comprising a cylindrical body of a refractory material and embodying a multitude of passages of relatively minute cross-sectional areas extending axially through said body longitudinally parallel with the peripheral wall of such body, such multitude of passages being cross-sectionally defined by networks of relatively thin walls and such multitude including, a plurality of patterns of said passages concentrically surrounding the longitudinal axis of said cylindrical body between such axis and said peripheral wall, said passages increasing in cross-sectional area progressively from a central one of said plurality of patterns of passages radially towards the next pattern of passages.

2. A core member in accordance with claim 1 and further including an oxidation catalyst material deposited on said networks of walls defining said multitude of passages.

3. A core member in accordance with claim 1 and in which said plurality of patterns of said passages comprises two of such patterns.

4. A core member in accordance with claim 2 and in which said plurality of patterns of said passages comprises two of such patterns.

5. A core member in accordance with claim 1 and in which the cross-sectional areas of said passages are square.

6. A core member in accordance with claim 2 and in which the cross-sectional areas of said passages are square.

7. A core member in accordance with claim 3 and in which the cross-sectional areas of said passages are square.

8. A core member in accordance with claim 4 and in which the cross-sectional areas of said passages are square.

9. A core member for use in a catalytic oxidation converter for internal combustion engine exhaust gases, such member comprising a cylindrical body of a refractory material having planar ends and embodying a multitude of passages of relatively minute areal cross-sections extending therethrough generally normal to said planar ends, such multitude of passages being cross-sectionally defined by networks of relatively thin and linearly discontinuous walls in the directions of the cross-sectional planes of said body, and the multitude comprising;

A. a generally hexagonal cross-sectional pattern of a plurality of hexagonal groups of similar passages with each such group geometrically congruent in areal cross-section with each of the other groups of said pattern and said groups each having six passages each, such pattern extending axially through the center of said cylindrical body;

B. a first generally annular cross-sectional pattern of a plurality of hexagonal groups of similar passages with each such group, in overall areal cross-section, geometrically congruent with each of the other groups of such pattern and with each of said groups of said hexagonal pattern, each of such groups of the annular pattern having four passages each, such annular pattern extending longitudinally through said cylindrical body in a surrounding relationship with said hexagonal pattern;

C. a second generally annular cross-sectional pattern of a plurality of hexagonal groups of similar passages with each of such groups having three passages each, and with such pattern geometrically similar in overall areal cross-section with said first annular pattern and with each group of passages of such second pattern geometrically congruent in overall areal cross-section with each of the other such groups of such pattern and with each of said groups of said hexagonal and said first annular patterns, such second annular pattern extending longitudinally through said cylindrical body in a surrounding relationship with said first annular pattern;

D. a third generally annular cross-sectional pattern of groups of similar passages with each of such groups having two passages each, such pattern being similar to said second annular pattern and extending longitudinally through said cylindrical body in a surrounding relationship with such second annular pattern; and E. a fourth generally annular cross-sectional pattern of passages extending through said cylindrical body in a surrounding relationship with said third annular pattern and with such fourth pattern extending to and including the peripheral wall of said cylindrical body, each of said passages of the fourth annular pattern being at least partly geometrically congruent in areal cross-section with each of the groups of passages of the previously mentioned patterns of such groups thereof.

10. A core member in accordance with claim 9 and further including an oxidation catalyst material deposited on said networks of walls defining said multitude of passages.

* * * * *